United States Patent [19]
Janke

[11] 3,973,295
[45] Aug. 10, 1976

[54] CUTOUT HOLDING CLIP

[76] Inventor: William R. Janke, Rte. 3, Northfield, Minn. 55057

[22] Filed: Aug. 2, 1974

[21] Appl. No.: 494,072

[52] U.S. Cl. .................................. 24/73 B; 85/11; 85/21; 248/27 A; 269/321 ME
[51] Int. Cl.² .................. A44B 21/00; G12B 9/00
[58] Field of Search ............ 24/73 B, 73 SC, 259 R, 24/259 PW, 259 SP, 259 FS, 259 SH, 81 B, 73 SA; 4/187 A; 52/357, 359; 248/27, 71; 85/11, 13, 21

[56] References Cited
UNITED STATES PATENTS

| | | | |
|---|---|---|---|
| 1,724,288 | 8/1929 | La Brecque | 85/11 |
| 2,485,189 | 10/1949 | Churchill | 24/259 R |
| 2,670,494 | 3/1954 | Owens | 85/11 |
| 3,555,577 | 1/1971 | Drain | 4/187 A |
| 3,811,666 | 5/1974 | Rogers | 269/321 F |

Primary Examiner—Bernard A. Gelak
Attorney, Agent, or Firm—Stuart R. Peterson

[57] ABSTRACT

An L-shaped clip of sheet metal is provided with a pair of resilient fingers having their connected ends offset from the plane of the clip leg that they are integral with, the fingers then curving upwardly at a decreasing radius with two points or teeth at the upper end of each finger, the four points (two on each finger) all being at different elevations. When cutting out a section of a panel to form an opening, such as in a counter top to accommodate a kitchen sink, an appropriate number (usually four) of clips are inserted into the saw kerf so that the resilient fingers prevent the cutout panel portion from falling, the various points or teeth frictionally pressing against the otherwise detached panel portion to releasably retain the panel portion in place.

9 Claims, 5 Drawing Figures 3,973,295

CUTOUT HOLDING CLIP

BACKGROUND OF THE INVENTION

1. Field of the Invention

This invention relates generally to resilient clips and pertains more particularly to a clip for releasably holding a portion of a panel in place after it has been severed by a saw.

2. Description of the Prior Art

Saw cuts are made for removing panel or wall portions in a variety of situations. With respect to counter tops, an opening must be made in order to accommodate the sink or basin therein. To form the proper size of opening, it is customary to outline the opening and then cut, either with a saber saw or manually, along the line. It is near or at the completion of the sawing procedure that a problem arises with respect to supporting the cutout panel portion so that it does not accidentally drop or fall. The problem is compounded by reason of the modern day use of melamine laminates, such as Formica or Micarta, which are adhesively secured to a substrate, usually plywood, for the frangible and brittle character of the relatively thin plastic laminate overlying the plywood results in severe damage to the laminate if the resulting cantilever effect is not obviated. Stated somewhat differently, as the saw kerf progresses around three sides, and most certainly as it advances along the fourth side, of the cutout panel section, the weight tending to break the plastic laminate becomes more and more pronounced. At just what stage of sawing the breaking of the laminate occurs is not predictable and the safest course is to have someone manually support the panel portion that is being cut so as to prevent its falling and the concomitant breaking of the laminate.

Even where a plastic laminate is not involved, difficulties are encountered in making various types of cutouts. For instance, cutting a hole in the roof of a building for a chimney or a vent poses a problem in that the section being removed can fall from the opening as the sawing nears completion. Not only can there result an irregular opening, but danger exists as far as the falling cutout injuring a worker down below. Even when sawing a hole or opening in a vertical wall, such as an opening for a window, the worker still does not want the cutout to fall in an uncontrolled manner, particularly when the opening is considerably above ground level, such as when making a second floor window opening.

The foregoing are only a few examples of difficulties that have been encountered. Others will be apparent to the various tradesmen and hobbyists who saw out sections to make openings for various purposes.

SUMMARY OF THE INVENTION

Accordingly, a general object of the present invention is to prevent cutouts from inadvertently becoming dislodged from the opening as the sawing operation nears completion or becomes fully completed. In this regard, an aim of the invention is to prevent the inadvertent dislodgement of the cutout, yet permit a ready intentional removal thereof. It is within the contemplation of the invention to effect the deliberate removal of the cutout in a direction toward the worker or toward the side of the cutout from which the sawing operation is being performed, this usually being considerably more convenient.

Another object of the invention is to provide a clip that will perform the foregoing function, yet when in use will present a substantially flush effect so that portions of the clip do not project from the panel or wall surface to the extent that any interference will result. Projections, it will be recognized, create a safety hazard, particularly with respect to the worker's hand striking the projection or possibly catching his shirt sleeve on the projection. In some instances, aesthetic factors enter into the picture and a flush condition without projections enhance such a situation, especially if the cutout is to remain unremoved for a period of time which can occur when remodeling homes.

Another object of the invention is to provide a clip that can be inexpensively fabricated and which, even though of low cost, can be used over and over, actually indefinitely.

Still another object is to provide a clip that will accommodate different panel or wall thicknesses. For instance, plywood panels are commerically sold in various thicknesses, and my clip can be used over a relatively wide range of thicknesses. Also, particularly with respect to plywood panels, the sawing operation produces rough and irregular edges; my clip effectively holds the cutout even where such rough and irregular edges are encountered.

Yet another object is to provide a clip that can be easily carried on one's person. In this regard, a clip constructed in accordance with the teachings of the present invention is quite small and also extremely lightweight.

Briefly, my invention comprises an L-shaped clip of sheet or strip metal, such as that used for banding or strapping bales and crates. The clip has a first relatively short leg that confronts the marginal face of the panel that remains after a saw cut has been completed, and has a second longer leg that is inserted into the kerf, the second leg having a pair of resilient fingers curving upwardly and outwardly, each having two points or teeth thereon at different elevations so as to assure the proper degree of pressural gripping for both thin and thick material being cut. The fingers are of the same length but stamped or punched so that their connected ends are at different distances from the end of the second leg which is attached to the first leg, the fingers curving outwardly at a constantly decreasing radius so that the points extend at an angle of approximately 45° with respect to the plane of the second leg, thereby rendering them suitable for bridging a relatively wide kerf and also for projecting into any irregular pockets that might exist in the edge of the cutout, such as frequently occur in plywood. In forming the fingers, a punch is employed that forces the base of the fingers into an offset relation with respect to the leg of the clip from which the fingers are struck. Thus, the panel or wall portion being cut out is releasably held, resisting any tendency to become dislodged in a direction away from the worker, yet permitting a facile withdrawal by the worker from the side he has been sawing from when the kerf is complete and the cutout fully severed.

DESCRIPTION OF THE PREFERRED EMBODIMENT

Figure 1:
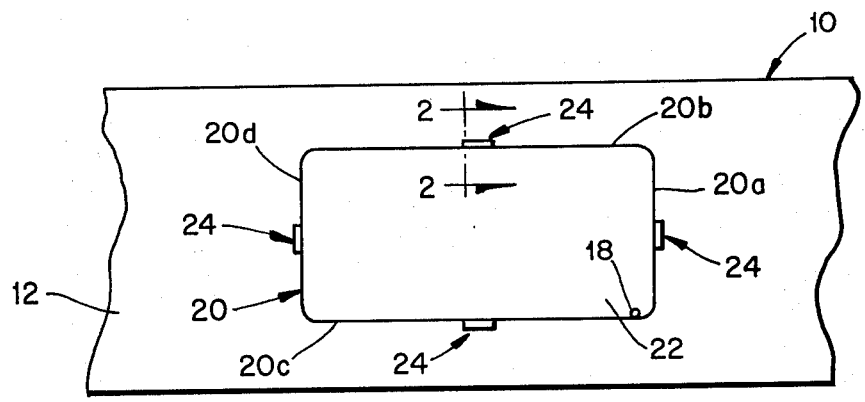
FIG. 1 is a plan view of a portion of a kitchen counter top in which the sawing has been completed and the resulting cutout held from falling by reason of four of my clips.

Although my invention can be employed to hold the resulting cutout where virtually any hole or opening is being formed by sawing, FIG. 1 fragmentarily depicts a counter top 10 composed of a melamine laminate 12 adhered to an underlying substrate 14. In this instance, the substrate 14 is a conventional plywood panel having a number of plies 16 factory-bonded together as is customary with plywood. Also, it will be recognized that the alternate plies 16 have their grain orientation at right angles. While this results in the plywood being relatively strong, nonetheless when sawn, the kerf edge can be somewhat irregular owing to the grain variations, the saw actually pulling or dislodging small sections of the plies during the cutting process.

In providing a rectangular opening in the counter top 10, a hole 18 is first drilled and then a saw blade (not shown), such as that attached to a saber saw, is inserted downwardly therethrough. Starting with the hole 18 the saw is advanced rectilinearly to form the rectangular saw kerf 20 which is approximately 1/16 inch (about 0.060 inch) wide. Assuming that the saw is first advanced from the hole 18 along the kerf portion labeled 20a there is no problem. Similarly, when making a curved cut onto and along the line 20b, there still exists no problem with respect to any falling out of the still prospective cutout. Because a counter top usually has a rear wall, which interferes with the saber saw casing if the casing is angled too much in the direction of such a wall the saw is again moved to the hole 18 and progresses along the line 20c to the left, increasingly creating a cantilever effect which progressively increases the difficulty. The difficulty becomes quite aggravated as the saw moves along the line 20d toward the rear kerf 20b. As the saw approaches or nears the completion of its cutting action in the formation of the rectangular kerf 20 composed of the cuts 20a, 20b, 20c and 20d, there becomes less and less counter top material remaining which appreciably increases the likelihood of the resulting cutout, which has been given the reference numeral 22, falling downwardly. Quite obviously, this breaks the melamine laminate 12 along an irregular path and could completely ruin the entire counter top 10 as a result of the separation of the cutout 22 prior to a complete detachment thereof by the saw blade.

The employment of my clip 24 (preferably four) prevents the above from happening. As can be discerned from FIGS. 3–5, the clip 24 has an L-shaped configuration, there being a first leg 26 and a second leg 28, their adjacent ends being connected at 30. The first leg 26 has an upwardly inclined flange 32 and a free end at 34 which is obviously remote from the end 30. The leg 28 has a free end 36 which is obviously also remote from the end 30.

At this stage, it may be helpful to explain that the clip 24 can be conveniently fabricated from relatively thin gauge strip stock, such as that customarily used for industrial banding and strapping purposes. Such material is available in ¾ inch widths and approximately 0.015 to 0.020 inch thicknesses being quite inexpensive. Actually, though, any low carbon strip steel will suffice, such steel (or equivalent metal) having enough resiliency for the contemplated gripping as will presently become clearer. In other words, it is not necessary to use a higher priced spring steel, although spring steel can be utilized if desired.

Figure 5:
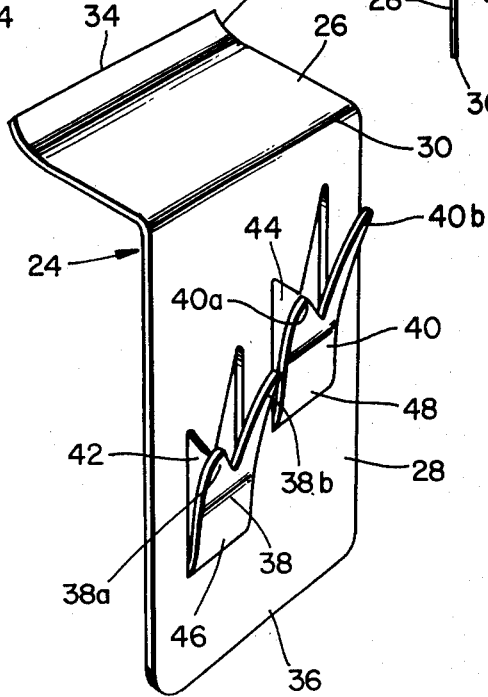
FIG. 5 is an enlarged perspective view of my clip.

At this time attention is directed to a pair of resilient fingers 38 and 40. Whereas each finger 38, 40 is the same length, it is apparent that the finger 38 is integrally connected to the leg 28 at a greater distance from the common edge 30 than is the finger 40. These fingers 38, 40 are actually strips integral with the leg 28 and at their free or upper ends are formed in each instance with a pair of points or teeth 38a, 38b and 40a and 40b, respectively. The entire clip 24 can be stamped or punched from sheet or strip stock so as to provide the proper distance between the free edges 34 and 36 when still in a planar form. The fingers 38, 40 can be formed at this time also so as to leave openings 42, 44 (FIG. 5). However, the fingers 38, 40 remain connected to the leg 28 at 46, 48, respectively, the connections 46, 48 being struck during the punching operation so that they are offset approximately the thickness of the metal stock constituting the clip 24 (which has been earlier mentioned as being in the range of from 0.015 to 0.020 inch. The reason for this offsetting at the locations 46, 48 will be explained when describing how my clip is used. The clip 24 can later be bent into the L-shaped configuration which produces the legs 26 and 28.

Figure 3:
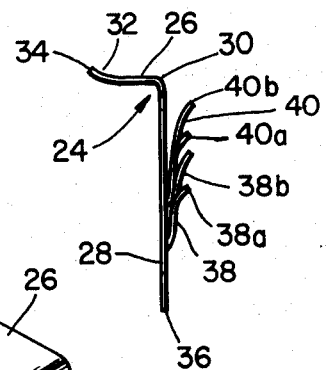
FIG. 3 is a side elevational view of a clip, the clip being oriented in the same direction in which it appears in FIG. 2 but prior to its insertion into the kerf.
Figure 4:
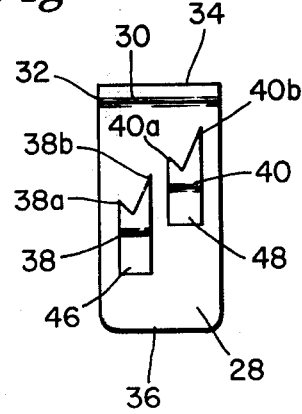
FIG. 4 is an elevational view of the clip depicted in FIG. 3, the view being taken from the right.

It is important, and this can be seen in FIGS. 3 and 5, to appreciate that the resilient fingers 38 and 40 are curved, the curvature actually becoming more pronounced, that is the radius of curvature becoming smaller, adjacent the points 38a and 38b, as far as the finger 38 is concerned, and the points 40a and 40b as far as the finger 40 is concerned. The smaller radius adjacent the points 38a, 38b, 40a and 40b results in an angulation of approximately 45° of these points, that is the free ends of the finger 38, 40 with respect to the plane of the leg 28. Further, it is planned that the points 38a, 38b, 40a, 40b be offset or displaced from the leg 28 in a direction opposite to the direction in which the first leg 26 extends. In this way, the points or teeth 38a, 38b, 40a, 40b will extend across any width of the kerf 20. Also, particularly with respect to plywood, the points are angled such as to project into any cavities or recesses that might be encountered in the plywood edges after the kerf 20 has been cut.

Although susceptible to variation, dimensions might be given. In this regard it is intended that the points 38a, 38b, 40a, 40b be offset from the plane of the leg 28 by ⅛ inch. This will assure that the points 38a, 38b, 40a, 40b will bridge virtually any width kerf 20 that may be made by the usual saw blade irrespective of whether mounted on a saber saw or is hand held. The fingers 38 and 40 can have a width on the order of ⅛ to 3/16 inch, the thickness thereof being the same as the thickness of the stock constituting the clip which has been mentioned as being on the order of from 0.015 to 0.020 inch. Inasmuch as the saw kerf is normally about 0.060 inch wide, stock of the alluded to thickness can readily be inserted in the kerf. More specifically, since the base or connected ends 46, 48 of the fingers 38, 40 are struck out about the thickness of the stock, the combined thickness is double at these regions.

It is contemplated that the point 40b will be spaced a distance of 3/16 inch from the upper edge 30, whereas the point 40a will be spaced down a total distance of 5/16 inch (⅛ inch greater). With a length of ½ inch from the point 40b to its connection at 48, this means that the connection 48 will be located 11/16 inch from the upper edge. As far as the other finger 38 is concerned, it is planned that the point 38b will be ½ inch beneath the upper edge 30 and that the point 38a will be ⅝ inch down. With a length of finger of ½ inch from the point 38b down to the connection at 46, this means that the connection 46 should be spaced downwardly a distance of one inch from the upper edge 30.

Although the lower edge 36 can be spaced virtually any distance downwardly from the upper edge 30 of the leg 28, a practical overall length of the leg 28 is 1¼ inches. The horizontal leg 26 has to confront the upper marginal surface of the remaining panel portion of the counter top 10 and a depth of ¼ inch has proven adequate with the flange 32 having a length or width of 1/16 inch. In other words, the distance between the edges 34 and 36 when the stock is flat would be about one and nine sixteenths inches. If the width of the fingers 38, 40 is 3/16 inch, then it is preferable that the left edge of the finger 38 be spaced inwardly from the left edge of the leg 28 approximately ⅛ inch and the right edge of the finger 40 spaced inwardly from the right edge of the leg 28 by the same amount, thereby leaving ⅛ inch between the two fingers. If a width of ⅛ inch is selected for the fingers 38, 40, then the fingers can have a lateral spacing of ¼ inch.

It is important to have the points 38a, 38b and 40a, 40b spaced at different distances from the top edge 30 in order to accommodate different thicknesses of material being cut. With plywood having a thickness of ¾ inch and the melamine lamination 12 a thickness of somewhat less than 1/16 inch, the points 38a, 38b, 40a, 40b (with the dimensions and locations given above) will adequately engage the edge of the cutout 22. Even when ⅝ inch plywood is encountered, the same spacing will adequately provide the appropriate contact with the edge of the panel portion 22 that has been cut.

Figure 2:
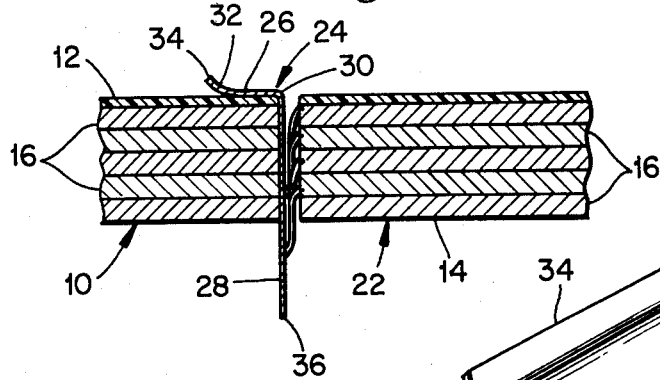
FIG. 2 is a sectional view taken in the direction of line 2—2 of FIG. 1 for the purpose of illustrating how the cutout is releasably retained in place.

Having presented the foregoing information, the manner of using my clip 24 should be readily understood. As the kerf 20 is cut, the clips 24 are inserted therein. Assuming that the portion 20a of the kerf 20 is completed first, then the user would simply introduce the edge 36 of the first clip 24 into this sawn portion 20a, pressing downwardly on the leg 26. This causes the leg 28 to move downwardly, flexing as it advances the first finger 38 and then the second finger 40, the action causing the fingers to be forced more into the plane of the leg 28 than they assume in their unflexed state appearing in FIGS. 3 and 5. Consequently, the fingers 38, 40 are forced generally into the relationship pictured in FIG. 2. Since the connections or bases 46, 48 have been punched so that they assume an offset relation corresponding to the thickness of the sheet metal stock, the fingers 38, 40 need not be flexed into the openings 42, 44 from which they are punched from. Therefore, they will be flexed over virtually their entire length without having to enter the openings 42, 44, the burring or unevenness from the punching precluding any such entry.

It is important to recognize that the flexed condition of the fingers 38, 40 (being flexed over virtually their entire length) cause the points 38a, 38b and 40a, 40b to act against the various plies 16 of the plywood panel 14, more specifically the portion thereof that becomes the cutout 22. It is really when the kerf 20 is advanced through a greater degree that the use of the clips 24 really becomes necessary. Thus, when the kerf portion 20b is completed, then the second clip 24 is inserted. When the kerf section 20c is made, then the third clip 24 is inserted, and finally the fourth clip 24 in the portion 20d of the kerf 20.

Although a lesser number of clips 24 can be employed, it should be appreciated that the use of four clips 24, the one being inserted into the kerf portion 20d being placed before the kerf portion 20d is completed, all contribute to assuring that the resulting cutout 22 will not fall gravitionally through the counter top 10.

The use of four clips also facilitates the withdrawal of the cutout 22 in that it can be raised by means of any two oppositely located clips 24, the additional pair of clips then serving as guides. It is believed evident from FIG. 2 that lifting the leg 26 will cause the points 38a, 38b, 40a and 40b on that particular clip 24 to bear sufficiently against the edges of the cutout 22 so that the cutout 22 moves upwardly. By grasping the clip 24 directly opposite the clip that has just been alluded to, this being the one contained in the kerf section 20c, lifting both of these clips will automatically raise the cutout 22. The clips 24 in the kerf sections 20b and 20d simply move upwardly with the cutout 22, functioning in a sense as guides. Once again it will be understood that the use of all four clips is not mandatory, but will for the most part provide adequate support under virtually all conditions, including those where the panel being cut constitutes a wall where a window opening is being formed. As already indicated, my clip 24 will find utility in a number of instances, functioning in almost any situation where a cutout operation is involved.

I claim:

1. A cutout holding clip comprising an L-shaped member of sheet material forming generally perpendicular first and second legs, said legs being connected to each other at one end along only a straight line, a pair of laterally spaced resilient fingers integrally connected at one end to said second leg at respective laterally spaced locations toward the free end of said second leg and extending toward said one end of said second leg which is connected to said first leg, said fingers each having two points at its free end which are offset from one face or side of said second leg in a direction opposite to the direction in which said first leg extends, the points on one of said fingers being located at different distances from said one end of said second leg and the points on the other of said fingers being located at still different distances from said one end of said second leg so that all of said points are at different distances from said one end of said second leg, whereby said second leg can be inserted in the kerf made by a saw when cutting out a portion of a panel or wall so that the points on said fingers press against the edge of the portion being cut out, said first leg confronting a marginal section of the panel surrounding the cutout portion.

2. A clip in accordance with claim 1 in which said fingers are curved.

3. A clip in accordance with claim 2 in which said fingers have a radius of curvature that decreases from a location between their connected and free or pointed ends toward their said free or pointed ends.

4. A clip in accordance with claim 3 in which said pointed ends are at an angle of approximately 45° with respect to the plane of said second leg.

5. A clip in accordance with claim 1 in which the connected ends of said fingers are offset from said one face or side of said second leg in a direction opposite to the direction in which said first leg extends an amount corresponding generally to the thickness of said second leg measured between said one face or side and the opposite face or side thereof.

6. A clip in accordance with claim 1 in which an incremental length of each finger adjacent said one end is slightly offset from the plane of said second leg and an incremental length of each finger adjacent the free or pointed end thereof extends generally at approximately 45° with respect to the plane of said second leg.

7. A cutout holding clip comprising an L-shaped member of sheet material having a thickness in the range of approximately from 0.015 to 0.020 inch forming generally perpendicular first and second legs, said legs having first and second ends and said first ends being connected together along a straight line, a resilient finger integrally connected at one end to said second leg at a location between the said first and second ends of said second leg and extending toward the first end thereof in a direction away from the side of said second leg which is opposite the side from which said first leg extends, said finger having a point at its free end angled outwardly and which is offset from the side of said second leg which is opposite the side from which said first leg extends, whereby said second leg can be inserted in the kerf made by a saw when cutting out a portion of a panel or wall so that the point on said finger presses against the edge of the portion being cut out, said first leg confronting a marginal section of the panel surrounding the cutout portion.

8. A clip in accordance with claim 7 in which said legs have a width of approximately ¾ inch.

9. A clip in accordance with claim 8 in which said second leg has a length greater than its width and said first leg having a length less than its width, the connected end of said finger being offset an amount corresponding generally to the thickness of said second leg and an incremental length of said finger adjacent the free or pointed end thereof extending generally at approximately 45° with respect to the plane of said second leg.

* * * * *